United States Patent [19]
Wheatley

[11] 3,817,277
[45] June 18, 1974

[54] WAFER UNIT CHECK VALVE
[75] Inventor: Charles Wheatley, Tulsa, Okla.
[73] Assignee: Charles Wheatley, Inc., Tulsa, Okla.
[22] Filed: Aug. 28, 1972
[21] Appl. No.: 284,205

[52] U.S. Cl............ 137/515.7, 137/527.8, 251/298
[51] Int. Cl............................................. F16k 15/03
[58] Field of Search ..... 137/515.7, 521, 527, 527.2, 137/527.4, 527.6, 527.8; 251/298, 303

[56] References Cited
UNITED STATES PATENTS
| | | | |
|---|---|---|---|
| 2,048,943 | 7/1936 | Munn | 137/527.4 |
| 2,717,001 | 9/1955 | Perrault | 137/527.4 X |
| 2,729,238 | 1/1956 | Hite | 137/515.7 |
| 2,930,400 | 3/1960 | Wheatley | 137/515.7 X |
| 3,612,097 | 10/1971 | Prince | 137/515.7 X |

*Primary Examiner*—William R. Cline
*Attorney, Agent, or Firm*—Mildred K. Flowers

[57] ABSTRACT

A wafer unit check valve comprising a unitary annular plate member having a pivotal closure member thereon and including a seating portion for the closure member, said plate provided with self contained sealing member and clamped between a pair of complementary flanged fitting members particularly designed and constructed for permitting freedom of movement for the closure member to provide an increased flow of fluid through the valve. The design of the flanged fitting members permits a minimum overall length for the check valve unit for reducing construction costs and weight of the valve.

2 Claims, 3 Drawing Figures

PATENTED JUN 18 1974 3,817,277

3,817,277

WAFER UNIT CHECK VALVE

BACKGROUND OF THE INVENTION

1. Field of the Invention

This invention relates to improvements in valves and more particularly, but not be way of limitation, to a wafer unit check valve having a minimum overall length and weight and an increased flow passageway therethrough.

2. Description of the Prior Art

Check valves are in wide-spread use today in flow lines, and the like, wherein it is desired to permit substantially free flow of fluid in one direction and preclude flow of the fluid in an opposite direction. It is frequently desirable to interpose a valve structure of this type in a minimum of space in the longitudinal direction of the flow line. In order to solve this problem many check valves of a relatively small overall length have been developed. These valves usually comprise a relatively thin body member, such as a plate, having a closure member pivotally secured therewith, with the plate member being clamped between a pair of standard flanged fittings as widely used in flow line construction. These valves have many disadvantages in that they are normally provided with substantially flat sealing gasket members interposed between the flanged fittings and the opposite sides of the plate member whereby the pressure applied to the flanges for tightening thereof sufficient to preclude leakage around the valve actually forces or bends the flanges toward each other. In addition, the opening movement of the closure member is hampered by engagement with the inner periphery of the flanged fitting adjacent thereto thus reducing the flow of fluid through the valve. Furthermore, the standard or normal flanged fittings usually utilized in combination with the closure portion of the valve is relatively large and heavy which increases the overall cost for the valve, and renders the installation of the valve more difficult.

SUMMARY OF THE INVENTION

The present invention contemplates a novel wafer unit check valve particularly designed and constructed for overcoming the above disadvantages. The novel wafer check valve comprises a self-sealing unit which includes a pair of complementary flanged fittings having a closure member and valve seat plate secured therebetween. The flanged fittings are particularly constructed for cooperating with the closure member in a manner permitting more freedom of movement of the closure in an opening direction to reduce flow restriction at the check valve and permit greater fluid flow through the valve. In addition, the fittings are constructed in a manner wherein the overall length of of the valve unit is maintained at a minimum, and the weight of the valve is greatly reduced, thus not only reducing the cost of construction, but also facilitating the handling or manipulation of the valve during installation thereof in a flow line.

DESCRIPTION OF THE PREFERRED EMBODIMENT

Figure 2:
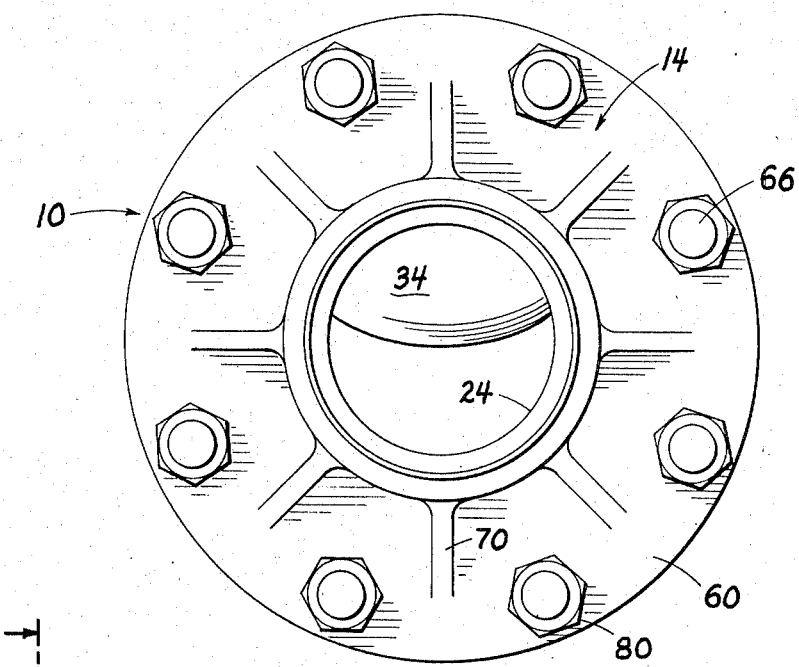
FIG. 2 is a view taken on line 2—2 of FIG. 1.
Figure 3:
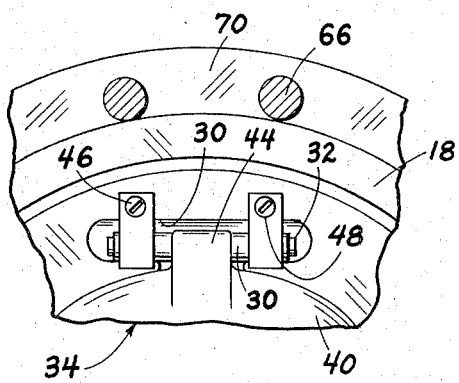
FIG. 3 is a view taken on line 3—3 of FIG. 1.
Figure 1:
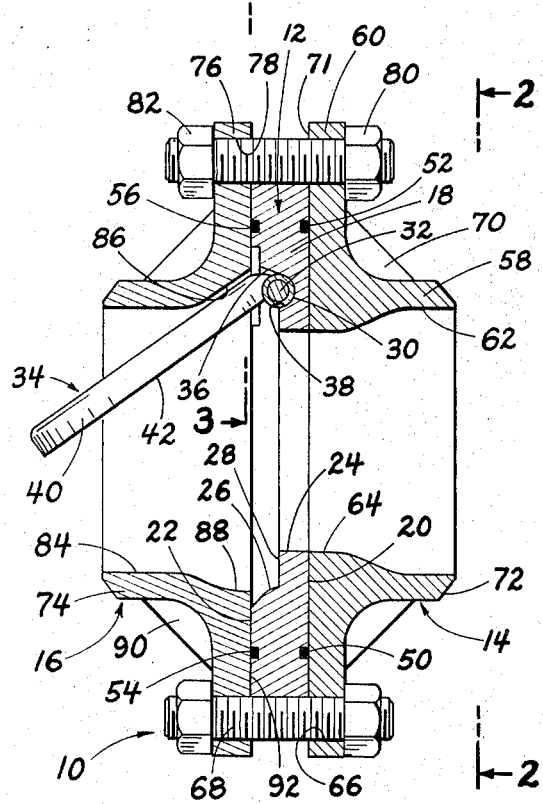
FIG. 1 is a sectional elevational valve of a wafer unit check valve embodying the invention.

Referring to the drawings in detail, reference character 10 generally indicates a wafer check valve comprising a closure assembly 12 interposed between a pair of oppositely disposed flanged fitting members 14 and 16. The closure assembly 12 comprises a substantially annular plate member 18 having substantially flat opposed sides or faces 20 and 22. The plate 18 is provided with a central bore 24 extending therethrough providing a fluid passageway through the valve 10 in the open position thereof. The bore 24 is enlarged at 26 to provide an annular shoulder 28 which functions as a valve seat for the valve 10. The shoulder 28 is provided with a transversely extending recess 30 for receiving a pivot shaft 32 of a closure member 34. The upper surface 36 of the recess 30 is preferably disposed at an upward angle of ten degrees from the horizontal as viewed in FIG. 1, and the lower surface 38 thereof preferably downwardly at an angle of approximately 10° for facilitating actuation of the closure member 34 as will be hereinafter set forth.

The closure member 34 comprises a circular or disc shaped element 40 having at least one substantially flat surface or face 42 adapted for seating against the valve seat 28 in the closed position of the valve 10. Of course, a suitable sealing member (not shown) may be interposed between the surface 42 and the valve seat 28, if desired, for precluding leakage of fluid in the closed position of the valve 10. An apertured boss 44 is welded or otherwise secured to the outer periphery of the disc 40 and projects slightly from the face 42 thereof in such a manner that the center or axis of the bore or aperture is in substantial alignment with the plane of the surface 42. The pivot shaft 32 extends through the apertured boss 44 and suitable plate members 46 and 48 may be bolted or otherwise secured to the plate 18 for retaining the shaft 32 within the recess 30, as is well known. Suitable bushing sleeves may be provided for the shaft 32 and disposed in the recess 30, if desired, for facilitating pivoting thereof during operation of the valve 10.

An annular recess 50 is provided on the face 20 of the plate 18 concentrically disposed with respect to the bore 24 for receiving a suitable O-ring 52, or the like, therein. A similar annular recess 54 is provided on the surface 22 concentrically disposed with respect to the bore 26 for receiving a suitable O-ring 56, or the like, therein. The O-rings 52 and 56 cooperate with the flanges fittings 14 and 16, respectively, for efficiently sealing of the plate 18 therebetween for precluding leakage of fluid thus providing a self-sealing valve.

The flange fitting 14 comprises a sleeve member 58 having an outwardly extending circumferential flange 60 provided at one end thereof. The sleeve 58 is provided with a central bore 62 extending longitudinally therethrough. The bore 62 is preferably of a diameter substantially equal to the inner diameter of the flow line (not shown) which the valve 10 is to be utilized, and the bore 62 is reduced at 64 to a diameter substantially equal to the diameter of the bore 24, as clearly shown in FIG. 1. A plurality of bolt holes 66 are circumferentially spaced around the flange 60 for receiving bolts 68 therethrough, as is well known. In addition, a plurality of circumferentially spaced web members 71 are welded or otherwise secured between the flange 60 and the outer periphery of the sleeve 58 for strengthening thereof. The outer face 70 of the flange 60 is substantially flat and bears against the surface 20 of the plate 18 as clearly shown in FIG. 1. The outer end of the sleeve 58 may be bevelled, as shown at 72, for facilitating welding of the fitting 14 in the flow line, as is well known. Of course, it will be apparent that the end of the sleeve 58 may be threaded, if desired, for threaded connection in the flow line, as is well known.

The fitting 16 is generally similar to the fitting 14 and comprises a sleeve 74 having an outwardly extending circumferential flange 76 provided at one end thereof. The flange 76 is provided with a plurality of circumferentially spaced bolt holes or bores 78 in substantial alignment with the bores 66 for receiving the bolts 68 therethrough. Suitable nuts 80 and 82 may be utilized in the usual manner for retaining the bolts 68 in the aligned bores 66 and 78 and for securing the flanges 60 and 76 together as will be hereinafter set forth. The sleeve 74 is provided with a central bore 84 extending longitudinally therethrough. The bore 84 is preferably a diameter substantially equal to the diameter of the inner diameter of the flow line (not shown) with which the fitting 16 is to be used. In addition, the bore 84 is in substantial alignment with the bore 24 for providing a fluid passageway through the valve 10 in the open position of the closure member 34.

The bore 84 is provided with an angularly disposed recess portion 86 extending around substantially the entire upper half of the circumference thereof, as viewed in the drawings, and in the proximity of the closure member 34. The angular disposition of the recess 86 is preferably substantially forty five degrees, and at the uppermost point thereof is preferably in substantial alignment with the outer edge of the angled recess 36. It will be apparent that the recess 86 permits a freedom of movement of the closure member 34 during opening thereof whereby the closure member 34 may travel through an arc to provide for a fuller opening of the closure member to increase the fluid flow through the valve 10. In addition, the bore 84 is preferably enlarged or recessed at 88 around the remaining half portion of the circumference thereof for assuring adequate clearance for the outer periphery of the closure member 34 during opening and closing of the valve 10.

The flange fitting 16 is further provided with a plurality of circumferentially spaced web members 90 similar to the web members 70 welded or otherwise secured between the flange 76 and the outer periphery of the sleeve 74 for strengthening thereof. Thus, the flange fittings 14 and 16 may be constructed in a manner reducing the weight thereof while maintaining the overall strength of the fitting. In addition, the flange 76 is provided with an outer face or surface 92 for bearing against the surface 22 of the plate 18 for cooperating with the fitting 14 in a manner as will be hereinafter set forth for clamping the plate 18 therebetween.

Whereas the particular embodiment shown herein depicts the pivot shaft 32 retained within the recess 30 by means of the plate members 46 and 48 bolted to the plate 18, it is to be noted that the plates 46 and 48 may be retained in position by the engagement of the surface 92 of the flange fitting 16 thereagainst, if desired.

The plate 18 is preferably circular around the outer periphery thereof, and the outer diameter thereof is substantially equal to the diameter defined or inscribed by the innermost point of the bolts 68. In this manner, the plate 18 may be properly centered when placed in position between the flanged fittings 14 and 16. In order to assemble the valve 10, it is preferable to assemble the flange fittings 14 and 16 in spaced relationship by inserting a portion of the bolts 68 through a portion of the aligned bores 66 and 78. It is preferable to insert the bolts 68 through the bores 66 and 78 disposed around approximately half the circumference of the fittings 14 and 16, leaving the remaining half of the circumference thereof open whereby the plate 18, having the closure member 34 disposed thereon, may be inserted between the flanges 60 and 76. As hereinbefore set forth, the outer diameter of the plate 18 is preferably substantially equal to the diameter of the circle inscribed or defined by the tangents of the most inwardly disposed portions of the bolts 68. Thus, when the plate 18 is inserted between the flanges 60 and 76, the outer periphery of the plate will be supported by the bolts 68 and will be properly centered whereby the longitudinal axis of the fittings 14 and 16 will substantially coincide with the axis of the bore 24 to provide a fluid passageway through the valve 10. The nuts 80 may then be tightened by suitable tools, as is well known, for securing the plate 18 between the flanges 60 and 76. The surfaces 20 and 70 will be in metal to metal engagement, and the O-ring 52 will bear against the surface 70 for efficiently precluding leakage of fluid. The surfaces 22 and 92 are similarly in a metal to metal engagement, and the O-ring 56 bears against the surface 92 for efficiently precluding leakage of fluid. Thus, the valve 10 is a self-sealing valve.

The closure member 34 normally hangs in a substantially vertical position with the face 42 thereof disposed against the valve seat 28. As hereinbefore set forth, the pivot axis of the shaft 32 is in substantial alignment with the plane of the surface 42, thus gravity constantly urges the disc member 40 in the vertical position against the valve seat 28 to provide a normally closed position for the valve 10. When the pressure acting on the upstream side or surface 42 of the disc 40 is greater than the downstream pressure, the closure member 40 will pivot about the shaft 32 in a clockwise direction, as viewed in FIG. 1, for opening of the valve 10. The disc 40 is free to pivot about the shaft 32 in the opening direction until contact is made with the angled recess 86. Of course, further opening movement of the disc 40 is limited by the engagement with the recess 86. The greater travel distance of the disc 40 provides a greater opening for the valve 10 to permit increased fluid flow through the valve.

The disc 40 will remain in the open position until the pressure differentials are such that the upstream pressure is less than the downstream pressure. When this condition occurs, the disc 40 will return to the normal position against the valve seat 28 through gravitational action. Normally, the metal to metal seal between the surface 42 and the valve seat 28 will be sufficient to preclude leakage of fluid through the closed valve in the reverse flow direction. However, if desired, a suitable sealing ring, such as an O-ring (not shown) shown) may be provided on the surface 42 or on the valve seat 28 for additional sealing of the valve in the closed position thereof.

From the foregoing it will be apparent that the present invention provides a wafer unit check valve which is particularly designed and constructed in a manner to be self-sealing, of a relatively short overall length, and of a reduced weight. The novel valve is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A wafer unit check valve comprising first flanged fitting means, second flanged fitting means, an annular plate member interposed between said flanged fitting means and having oppositely disposed substantially flat surfaces engaged thereby, recessed annular valve seat means provided on the plate member, recess means provided on the plate member in the proximity of the recessed valve seat means and having an outwardly diverging substantially conical outer periphery, a pivot shaft disposed in said recess means, a disc member cooperating with the recessed valve seat means to provide alternate open and closed positions for the valve, apertured means secured to the outer periphery of said disc member for receiving the pivot shaft therethrough to pivotally secure the disc means to the pivot shaft, the axis of said apertured means being in substantial alignment with the plane of one face of the disc member whereby gravity constantly urges the disc member into a closed position against the recessed valve seat means, recess means provided on the inner periphery of one of said flanged fittings in the proximity of the pivot shaft for clearance of the disc member during opening of the valve whereby flow of fluid through the open valve is increased, and O-ring sealing means interposed between the annular plate member and each of the flanged fitting means for precluding leakage of fluid therebetween.

2. A wafer unit check valve as set forth in claim 1 wherein the outwardly diverging outer periphery of the recess is at an angle of approximately ten degrees with respect to the central axis coinciding with the flow path through the valve.

* * * * *